Patented Oct. 5, 1926.

1,601,838

UNITED STATES PATENT OFFICE.

GEORGE HENDRIC WEITZEL, OF STRATFORD, ONTARIO, CANADA, ASSIGNOR OF ONE-TENTH TO ARTHUR EDWIN TAYLOR, OF STRATFORD, ONTARIO, CANADA.

METHOD OF SHRINKING WOOLENS.

No Drawing.   Application filed February 8, 1924.  Serial No. 691,516.

The composition of my invention consists of the following ingredients, combined in the proportions stated, viz:

| | Pound. |
|---|---|
| Salt | 1 |
| Saltpetre | ½ |
| Alum | 1 |

These ingredients are to be thoroughly mingled by agitation.

In using the above named composition, the woolen goods to be treated are placed in a vessel and covered with substantially pure water which has been brought to a boiling point. To each twenty-five pounds of woolen goods requiring treatment, 10 ounces of the composition is added to the boilng water. The woolen goods are then boiled in the above mentioned solution for approximately three minutes after which they are removed and are thoroughly rinsed in substantially pure water.

By use of this composition, woolen goods may be treated with expediency and facility and with the result that subsequent shrinkage is prevened.

I prefer to vend my composition of matter in powdered form in view of the facility with which it may be handled. However, I claim the use of the herein described composition of matter in liquid form as is defined by the spirit of the invention and the scope of the appended claims.

What I claim and desire to secure by Letters Patent of the United States of America is:

1. The method of shrinking woolens as herein described consisting in submerging the woolen goods in water brought to boiling point and adding to the water a compound of common salt, saltpetre and alum and boiling the goods in said solution and rinsing.

2. The method of shrinking woolens as herein described consisting in submerging the woolen goods in water brought to boiling point and adding to the water a compound containing 40 parts of salt, 20 parts of saltpetre and 40 parts of alum, and boiling the goods in said solution and then rinsing.

3. The method of shrinking woolens as herein described consisting in submerging the woolen goods in water brought to boiling point and adding to the water a compound of common salt, saltpetre and alum and boiling the goods for approximately three minutes in the solution and then rinsing in substantially pure water.

GEORGE HENDRIC WEITZEL.